United States Patent Office 3,049,416
Patented Aug. 14, 1962

3,049,416
PRODUCTION OF PHOSPHATE FERTILIZERS
Geoffrey George Brown, Woodbridge, and Roy Geoffrey Wilson, Ipswich, England, assignors to Fisons Fertilizers Limited, Felixstowe, England, a British company
No Drawing. Filed June 15, 1960, Ser. No. 36,149
Claims priority, application Great Britain June 24, 1959
13 Claims. (Cl. 71—37)

The present invention relates to improvements in the manufacture of fertilizers.

Fertilizers normally comprise mixtures of salts containing the elements required for plant nutrition, namely nitrogen, phosphorus and potassium. The nitrogen in such mixtures is normally derived from ammonium salts such as ammonium sulphate, ammonium nitrate and the like, or other nitrogenous materials such as nitric acid and urea; the phosphorus is usually derived from phosphate rock, and the potassium is normally derived from a potassium salt such as potassium chloride.

Naturally occurring phosphate rock contains phosphate which generally is unavailable or difficultly available as plant food, and thus requires treatment to convert the phosphate into a form available as a plant food. Such methods comprise for example, treating the phosphate rock with acids or alkalis, the most commonly used methods beings the acidulation of phosphate rock. In the acidulation of phosphate rock a large number of acids may be used, but the acids used commercially are the strong mineral acids, namely sulphuric acid, phosphoric acid and nitric acid. These acids may be used alone or in combination together.

The present invention relates particularly to the production of fertilizers involving the acidulation of phosphate rock with nitric acid, with or without other acids. In such processes, one of the salts produced is calcium nitrate, which, as it is markedly hygroscopic, is unsuitable for inclusion in a mixed fertilizer. It is known that calcium nitrate may be treated with potassium sulphate so as to form calcium sulphate and potassium nitrate.

However, by the addition of potassium sulphate to the product of acidulation of phosphate rock with nitric acid, the reaction does not proceed simply and calcium-potassium double sulphates are frequently formed. These double salts are insoluble in water and their formation renders the whole process uneconomic. In carrying out this reaction the precipitates which may be formed comprise gypsum ($CaSO_4.2H_2O$), anhydrite ($CaSO_4$), hemihydrate ($CaSO_4.\frac{1}{2}H_2O$), penta salt ($5CaSO_4.K_2SO_4.H_2O$) and syngenite ($CaSO_4.K_2SO_4.H_2O$).

It has now been found that by carrying out the reaction continuously and inter alia ensuring that the soluble sulphate concentration is 0.5 to 4.0%, and at a temperature in the range 60–90° C., the precipitate formed is calcium sulphate substantially in the form of gypsum. Where the soluble sulphate concentration and temperature fall outside these limits pentasalt and/or syngenite are formed with consequent loss of potassium to an insoluble condition.

Accordingly the present invention is for a continuous process for the production of a phosphate fertilizer which comprises acidulating phosphate rock with nitric acid, with or without other acids such as sulphuric acid, adding potassium sulphate in amount such that the soluble sulphate concentration in the liquid phase is maintained in the range 0.5–4%, the reaction temperature at the addition of potassium sulphate being maintained in the range 60–90° C., continuously removing the reaction product, if desired removing therefrom the precipitated calcium sulphate, and if desired treating the reaction product or the liquor with a neutralizing agent.

Where only a low analysis fertilizer is required the gypsum may be left in the fertilizer. However where a high analysis fertilizer is required the precipitated calcium sulphate must be removed. The fertilizer may be used in the form of the acidic reaction product. More generally however it is desired to obtain a solid substantially neutral product, and the product consequently requires treatment with a neutralising agent, which may comprise for example ammonia or potassium hydroxide. The resulting product may be dried and/or granulated.

The process of the invention including the steps of removal of gypsum and neutralisation leads to the production of a complex, high-analysis, non-hygroscopic fertilizer which contains the elements nitrogen, phosphorus and potassium, and which is chloride free.

The neutralizing agent which is used is preferably ammonia or an ammoniating solution, since, inter alia these are the cheapest sources of nitrogen. If desired, however, other neutralizing agents such as potassium carbonate and potassium hydroxide may be used. In its simplest form the process of the present invention may be represented by the following equations:

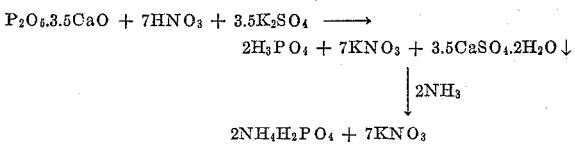

or alternatively using lessnitric acid as:

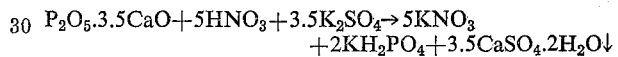

In the latter case the resulting product is not markedly acidic and may not require ammoniation. If it is desired to vary the N:P:K ratios this may be achieved for example by adding nitric acid, phosphoric acid or potassium salts and thereafter ammoniating.

In practice the reactions need not follow exactly the formula indicated above, for example in ammoniation it is possible to obtain a mixture of mono- and diammonium phosphates. The proportion of the neutralizing agent may be greater or less than indicated above.

The process may be carried out by first acidulating the rock and subsequently adding the sulphate to the product. A preferred embodiment of the invention is for the rock, nitric acid and sulphate reactants to be added simultaneously to the reaction.

An essential feature of the invention is that the process is carried out as a continuous process with continuous addition of the reactants and continuous removal of the product. The process cannot be carried out as a batch process.

Where nitric acid is used alone, it is preferably used in amounts in excess over the molar requirements of 5 moles per mole of $P_2O_5$ in the rock. The amount of acid used suitably falls in the range 5–15 moles per mole of $P_2O_5$ in the rock. With the use of excess nitric acid, the product will also contain ammonium nitrate, and if desired, part of this excess may be added later in the process after filtration.

The phosphate rock may, if desired, be acidulated with a mixture of acids comprising nitric acid and sulphuric acid and/or phosphoric acid. With the use of mixed acids the amount of nitric acid may be reduced if desired, providing, however, that total acidity of the mixed acids is equivalent to greater than 5 moles of nitric acid per mole or $P_2O_5$ in the rock. The nitric acid component of the mixed acids, however, should not be less than 3 moles per mole of $P_2O_5$ in the rock.

Where sulphuric acid or any other sulphate is employed, this will have an effect on the precipitation of calcium sulphate, and the total sulphate ions present in the liquid phase derived from any source must lie in the range 0.5–4%. It will thus be seen that all the components of the reaction mixture are interrelated, and may be adjusted as desired to give a fertilizer of the desired composition.

Where mixed acids are employed in the acidulation step, nitric acid with or without sulphuric acid will always be used in the acidulation stage; where sulphuric acid is used this is preferably added before the filtration stage; other acids may be added immediately after the filtration stage, and may be used mixed together or used sequentially.

Thus, for example when using a mixture of nitric acid, sulphuric acid and phosphoric acid, it may be desirable to treat the phosphate rock first with sulphuric acid and nitric acid and after the filtration stage to add the phosphoric acid. Alternatively, part of the nitric acid may be used to react the phosphate rock together with the other acids and the remainder added later.

The acids employed in the process of the present invention are preferably used in the form of the commercially available concentrated acids. Thus nitric acid of 40–80% concentration, for example about 57% concentration may be suitably used. Where sulphuric acid is used, this is suitably of a concentration 50–100%, for example about 96% concentration and where phosphoric acid is used, this is suitably of a concentration of 50–70%, for example about 60% concentration (expressed as $H_3PO_4$). The phosphate rocks commonly employed, such for example as the calcium phosphate rock which may be obtained, for example from Morocco, Rhodesia, Florida, various Pacific Islands, Uganda, Palabora and Kola. The phosphate rock suitably is not finely ground and is of a particle size of about $\frac{1}{16}$ inch or less.

At the addition of potassium sulphate to the system the soluble sulphate concentration in the liquid phase must be in the range 0.5–4.0%, preferably about 1–1.5% sulphate, and also the reaction temperature must be in the range 60–90° C., preferably 80° C. so that the calcium sulphate is precipitated as gypsum ($CaSO_4 \cdot 2H_2O$). The condition of the gypsum precipitate varies with the reaction conditions, and when operating at the preferred limits of a soluble sulphate concentration in the liquid phase of 1–1.5% and at a temperature of about 80° C. the gypsum precipitate is obtained in the most readily filtrable condition.

The soluble sulphate content may be conveniently maintained in the required range by the use of a continuously stirred tank reactor system. The continuous stirred tank reaction system may comprise one or more tanks. It has been found desirable to carry out the process using a multiple tank reaction system, preferably incorporating three tanks. In the case of a multiple tank reaction system the reaction mixture flows sequentially through the tanks.

In the multiple tank system the phosphate rock and part or all of the nitric and phosphoric acids may be added to the first tank. The potassium sulphate and sulphuric acid may be added either only to the first tank or to one or more subsequent tanks in accordance with the nature of the reaction. Good agitation is essential in all parts of the reaction system to avoid local high concentration of soluble sulphate.

The soluble sulphate ion addition requires to be adjusted at all times so that the soluble sulphate concentration in the liquid phase is within the prescribed limits of 0.5–4%. By the reaction of acid with rock in accordance with the process calcium ions are released and these react with the sulphate ions to form calcium sulphate which is precipitated. Consequently therefore the soluble sulphate concentration in the liquid phase represents the available sulphate ions which are in excess of the available calcium ions. In order to maintain the soluble sulphate concentration within the prescribed limits of 0.5–4% the rate of addition of sulphate ions must not be substantially in excess of the rate of formation of calcium ions by the acid degradation of the phosphate rock.

In general the acid degradation of the rock is rapid and in such cases the whole of the required proportion of the sulphate may be added to the first stage of the process. However in any case where the acid degradation of the rock is slow the sulphate addition requires to be modified accordingly.

The residence time of the reaction mixture in the system may vary over a wide range of for example 30 minutes to 2 hours, but this is preferably of the order of 1 hour.

The total sulphate addition, whether as potassium sulphate or sulphuric acid, should desirably not comprise more than about 3.5 moles per mole of $P_2O_5$ in the rock; the amount of potassium sulphate should not comprise less than about 0.5 mole per mole of $P_2O_5$ in the rock.

If desired the system may be carried out with recycle of the liquid product and/or the wash liquors from the gypsum filtration stage.

The reactants employed in the present invention may be adjusted to give a fertilizer product of desired composition. Thus for example a fertilizer containing 58 units of plant nutrients per 100 units with an analysis of $N/P_2O_5/K_2O$ of 15.25/15.25/27.5 may be obtained by reacting phosphate rock with nitric acid and sulphuric acids in the presence of potassium sulphate in the manner prescribed above, filtering off the calcium sulphate, adding more nitric acid and thereafter ammoniating, according to the following equations:

$P_2O_5 \cdot 3.5CaO + 5.43HNO_3 + 0.785H_2SO_4 + 2.715K_2SO_4$ $\downarrow$ $2H_3PO_4 + 5.43KNO_3 + 3.5CaSO_4 \cdot 2H_2O \downarrow$ $\downarrow 1.355HNO_3$
then
$\downarrow 3.355NH_3$ $2NH_4H_2PO_4 + 5.43KNO_3 + 1.355NH_4NO_3$ The following examples are given to illustrate the process of the present invention. The percentage quoted are by weight unless otherwise indicated.

*Example 1*

425 parts of phosphate rock ex Morocco (33.4% $P_2O_5$, 50.3% CaO) per hour were reacted continuously with 600 parts of 57% nitric acid per hour, and 80 parts of 96% sulphuric acid per hour, and 473 parts of potassium sulphate per hour, and 500 parts of water per hour, at 80° C. The reaction was carried out in a stirred tank reaction vessel from which the product was removed by overflow. The residence time was 30 minutes and $SO_4$ concentration 0.8%. The product removed from the vessel was filtered on a belt filter to remove the precipitated gypsum and 150 parts of 57% nitric acid per hour were added to the filtrate. 57 parts of anhydrous ammonia per hour were added to this filtrate to give, after granulation and drying, a fertilizer containing monoammonium phosphate, ammonium nitrate and potassium nitrate.

This fertilizer containing 5% impurities contained 58 plant units per 100 parts and the $N:P_2O_5:K_2O$ analysis was 15.25:15.25:27.5. The precipitated calcium sulphate was essentially in the form of gypsum.

*Example 2*

425 parts of phosphate rock ex Morocco (33.4% $P_2O_5$, 50.3% CaO) per hour were reacted continuously with 334 parts of 57% nitric acid per hour, 203 parts of 96% sulphuric acid per hour, and 263 parts of potassium sulphate together with 650 parts of water per hour at 80° C., the reaction was carried out in a stirred tank reaction vessel from which the product was removed by overflow. The residence time was 1½ hours and $SO_4$ concentration 1.4%. The liquid product removed continuously was filtered using a belt filter to separate the precipitated gypsum and 508 parts of 57% nitric acid per hour were added to the filtrate. Ammonia was added to the filtrate at a rate of 129 parts per hour. After granulation and drying a fertilizer containing mono- and diammonium phosphate, ammonium nitrate and potassium nitrate was produced.

The final product allowing 5% for impurities contains 51 plant units, having an $N:P_2O_5:K_2O$ ratio of 3:2:2 the analysis being 22–14.5–14.5. The precipitated calcium sulphate was essentially in the form of gypsum.

*Example 3*

425 parts of unground phosphate ex Florida (33.4%, 48% CaO) per hour were added to the first tank of 3 tanks in a continuous stirred tank reaction system maintained at 80° C. with a retention time of twenty minutes in each tank. Into the first tank were also added 278 parts of 70% sulphuric acid per hour, 334 parts of 57% nitric acid per hour, 176 parts of potassium sulphate per hour and 540 parts of water per hour. Into the second tank were added 87 parts of potassium sulphate per hour. The soluble sulphate concentration in the liquid phase was maintained at 1.1%.

After overflowing from the third tank, the slurry was filtered to remove gypsum and 283 parts of 57% nitric acid per hour were added to the filtrate. Ammonia was then added at a rate of 77 parts per hour. After granulation and drying, a 1:1:1 $N:P_2O_5:K_2O$ ratio fertilizer was obtained comprising 55 plant units and analysing 18.25:18.25:18.25. The precipitated calcium sulphate was essentially in the form of gypsum.

*Example 4*

Morocco phosphate rock (33.4% $P_2O_5$) equivalent to 100 parts of $P_2O_5$ per hour was reacted continuously with 277.5 parts of potassium sulphate per hour, 86.3 parts of 98% sulphuric acid per hour, 304 parts of 66% nitric acid per hour, together with 1000 parts of filter washings and recycle per hour at 78° C. During this continuous acidulation reaction the sulphate concentration of the liquid phase was controlled at 0.6% w./w. $SO_4$. The apparatus employed is shown schematically in the accompanying drawing.

The precipitated gypsum was filtered off upon a continuous belt filter and 121.5 parts of 66% nitric acid per hour were added to the filtrate, 45.7 parts of anhydrous ammonia per hour were added to the filtrate to give, after granulation and drying, a fertilizer containing 56 plant nutrient, which analysed at 16:16:24, $N:P_2O_5:K_2O$. The filter cake was washed with water and the washings recycled. The precipitated calcium sulphate was essentially in the form of gypsum.

*Example 5*

Florida phosphate rock (33.5% $P_2O_5$) equivalent to 100 parts of $P_2O_5$ per hour were reacted continuously with 277.5 parts of potassium sulphate per hour, 87.3 parts of 98% sulphuric acid per hour, 304 parts of 66% nitric acid per hour, together with 1000 parts of filter washings and recycle per hour, at 85° C. During this continuous acidulation reaction the sulphate concentration of the liquid phase was controlled at 1.2% w./w. $SO_4$.

The precipitated gypsum was filtered off upon a continuous filter and 121.5 parts of 66% nitric acid per hour were added to the filtrate, 45.7 parts of anhydrous ammonia per hour were added to the filtrate to give, after granulation and drying, a fertilizer containing 56 plant nutrients, which analysed at 16:16:24, $N:P_2O_5:K_2O$. The filter cake was washed with water and the washings recycled. The precipitated calcium sulphate was essentially in the form of gypsum.

Solely by way of comparison Florida phosphate rock (33.5% $P_2O_5$) equivalent to 100 parts of $P_2O_5$ per hour were reacted continuously with 277.5 parts of potassium sulphate per hour, 88.3 parts of 98% sulphuric acid per hour and 304 parts of 66% nitric acid per hour, together with 1000 parts per hour of filter washings from the process above at 55° C. The sulphate concentration of the liquid phase was maintained at 1.9% w./w. $SO_4$. The slurry overflowing to the filter contains calcium sulphate in the form of pentasalt and syngenite, and operation in this way led to substantial losses of potassium.

*Example 6*

Unground (−16 mesh) Morocco phosphate rock (33.4% $P_2O_5$) equivalent to 100 parts of $P_2O_5$ per hour were added to the first three tanks in a continuous stirred tank reactor system with overflow maintained at 70° C. with a retention time of 20 minutes in each tank. Into the first tank were also added 190 parts of potassium sulphate per hour, 88.4 parts of 98% sulphuric acid per hour and 304 parts of 66% nitric acid per hour, together with 1000 parts of filter washings and recycle. Into the second tank were added 87.5 parts of potassium sulphate per hour. The sulphate concentration of the liquid phase of the slurry issuing from the third tank was controlled at 2% w./w. $SO_4$.

After overflowing from the third tank the precipitated gypsum was filtered off upon a continuous filter and 121.5 parts of 66% nitric acid per hour were added to the filtrate, 45.7 parts of anhydrous ammonia per hour were added to the filtrate to give, after granulation and drying, a fertilizer containing 56 plant nutrients which analysed at 16:16:24 $N:P_2O_5:K_2O$. The precipitated calcium sulphate was essentially in the form of gypsum.

Solely by way of comparison unground (−16 mesh) Morocco rock (33.4% $P_2O_5$) equivalent to 100 parts of $P_2O_5$ per hour were reacted continuously with 277.5 parts of potassium sulphate per hour, 101.3 parts of 98% sulphuric acid per hour, 304 parts of 66% nitric acid per hour, together with 1000 parts of filter washings and recycled per hour at 80° C., in a continuously stirred tank reactor system with a retention time of 20 minutes in each tank exactly as described above. The sulphate concentration of the liquid phase of the slurry issuing from the third tank was maintained at 6% $SO_4$. The calcium sulphate in the slurry overflowing from the third tank was in the form of penta salt ($5CaSO_4.K_2SO_4.H_2O$) and the operation in this way led to substantial losses of potassium.

Similarly solely by way of comparison, unground Morocco rock (33.4% $P_2O_5$) equivalent to 100 parts of $P_2O_5$ per hour were reacted continuously with 277.5 parts of potassium sulphate per hour, 105 parts of 98% sulphuric acid per hour, 304 parts of 66% nitric acid per hour, together with 1000 parts of filter washings and recycle per hour at 85° C., in a continuous stirred tank reactor system of three tanks with a holding time of 20 minutes in each tank exactly as described above. The sulphate concentration in the liquid phase was 8%. The slurry overflowing from the third tank contained large quantities of unreacted rock and syngenite ($CaSO_4.K_2SO_4.H_2O$) and thus the conversion of the rock was low coupled with substantial losses of potassium.

*Example 7*

Unground (−16 mesh) Morocco phosphate rock (33.4% $P_2O_5$) equivalent to 142 parts of $P_2O_5$ per hour were added to the first three tanks in a continuous stirred reactor system, with overflow maintained at 80° C. with a retention time of 30 minutes in each tank. Into the first tank were also added 459 parts of potassium sulphate per hour, 1,105 parts of 57% nitric acid per hour, together with 1,500 parts of filter washings and recycle. Into the second tank were added 150 parts of potassium sulphate per hour. The sulphate concentration of the liquid phase of the slurry was controlled at 1.2% w./w. sulphate.

After overflowing from the third tank the precipitated gypsum was filtered off upon a continuous filter and 85 parts of anhydrous ammonia per hour were added to the filtrate. After granulation and drying a fertilizer having a ratio 1.5:1:2.32, $N:P_2O_5:K_2O$ ratio was obtained. The precipitated calcium sulphate was essentially in the form of gypsum.

We claim:

1. A continuous process for the production of a phosphate fertilizer, which comprises acidulating phosphate rock with from 5 to 15 moles of nitric acid per mole of $P_2O_5$ contained in the rock, adding potassium sulphate to the acidulated product at such a rate that the soluble sulphate concentration in the liquid phase is maintained within the range of about 0.5 to 4%, maintaining the reaction temperature in the range between about 60° C., and 90° C., and continuously removing the reaction product from the reaction system, whereby the said reaction product is obtained as a calcium sulphate substantially in the form of gypsum.

2. A continuous process for the production of a phosphate fertilizer, which comprises mixing together in a stirred tank reaction system phosphate rock, at least 3 moles of nitric acid per mole of $P_2O_5$ contained in the rock, potassium sulphate and sulphuric acid, maintaining the reaction temperature in the range between about 60° C. and 90° C., adding further potassium sulphate and sulphuric acid at such a rate that the soluble sulphate concentration in the liquid phase is maintained within the range of about 0.5 to 4%, the total acidity being equivalent to 5–15 moles of nitric acid per mol of $P_2O_5$ contained in the rock, continuously removing the reaction product from the reaction system, and adding a neutralizing agent to the reaction product, whereby the said reaction product is obtained as a calcium sulphate substantially in the form of gypsum.

3. A continuous process as claimed in claim 2 wherein the nitric acid is of a concentration in the range of about 40 to 80% by weight.

4. A continuous process as claimed in claim 2 wherein the sulphuric acid being added is of a concentration in the range of 50 to 100% by weight.

5. A process as claimed in claim 2 wherein the phosphate rock is a calcium phosphate type rock.

6. A process as claimed in claim 2 wherein the concentration of soluble sulphate in the liquid phase is maintained within the range of about 1 to 1.5%.

7. A process as claimed in claim 2 wherein the reaction temperature is maintained at about 80° C.

8. A process as claimed in claim 2 wherein the total amount of sulphate ion added in the form of potassium sulphate and of sulphuric acid is maximally about 3.5 moles per mole of $P_2O_5$ in the rock.

9. A process as claimed in claim 2 wherein at least 0.5 of potassium sulphate is added per mole of $P_2O_5$ in the rock.

10. A continuous process for the production of a phosphate fertilizer, which comprises mixing together in a multiple stirred tank reaction system phosphate rock and at least 3 moles of nitric acid per mole of $P_2O_5$ contained in the rock, causing the reaction mixture to flow through the reaction tanks of the system in series, maintaining throughout the reaction a temperature in the range between 60° C. and 90° C., adding potassium sulphate and sulphuric acid at such a rate that the soluble sulphate concentration in the liquid phase is maintained within the range of about 0.5 to 4%, the total acidity being equivalent to 5–15 moles of nitric acid per mole of $P_2O_5$ contained in the rock, and continuously removing the reaction product from the reaction system, whereby the said reaction product is obtained as a calcium sulphate substantially in the form of gypsum.

11. A continuous process as claimed in claim 10 wherein part of the reactants are added to at least one of the second and subsequent tanks, in the reaction system.

12. A continuous process for the production of a phosphate fertilizer which comprises mixing together in a stirred tank reaction system phosphate rock, at least 3 moles of nitric acid and at least 0.5 mole of potassium sulphate per mole of $P_2O_5$ in the said rock, and sulphuric acid in such amount that the total acidity of nitric acid and sulphuric acid is at least equivalent to 5 moles of nitric acid per mole of $P_2O_5$ in the rock, the total amount of sulphate ion added being maximally 3.5 moles per mole of $P_2O_5$ in the rock, maintaining throughout the reaction a temperature in the range between 60° C. and 90° C., maintaining a soluble sulphate concentration in the range of 0.5 to 4%, and continuously removing the reaction product from the system and separating the product liquor from the precipitated calcium sulphate in the reaction product, whereby the said reaction product is obtained as a calcium sulphate substantially in the form of gypsum.

13. A continuous process for the production of a phosphate fertilizer which comprises mixing together in a stirred tank reaction system phosphate rock at least 3 moles of nitric acid per mole of $P_2O_5$ in the rock, potassium sulphate and sulphuric acid, maintaining throughout the reaction a temperature in the range between 60° C. and 90° C., adding during the reaction a member selected from the group consisting of potassium sulphate and sulphuric acid, in such amount that the total acidity of nitric acid and sulphuric acid is at least equivalent to 5 moles of nitric acid per mole of $P_2O_5$ in the rock, and that the number of sulphate ions added is substantially in excess of the rate of formation of calcium ions, maintaining the soluble sulphate concentration in the liquid phase within the range of 1 to 1.5%, and continuously removing the reaction product from the reaction system, whereby the said reaction product is obtained as a calcium sulphate substantially in the form of gypsum.

References Cited in the file of this patent

UNITED STATES PATENTS

| | | |
|---|---|---|
| 1,517,687 | Voerkelius | Dec. 2, 1924 |
| 1,788,828 | Goldberg et al. | Jan. 13, 1931 |
| 1,876,501 | Johnson | Sept. 6, 1932 |